United States Patent
Wang et al.

(10) Patent No.: US 11,507,823 B2
(45) Date of Patent: Nov. 22, 2022

(54) ADAPTIVE QUANTIZATION AND MIXED PRECISION IN A NETWORK

(71) Applicant: Black Sesame International Holding Limited, Santa Clara, CA (US)

(72) Inventors: Zuoguan Wang, Los Gatos, CA (US); Tian Zhou, Menlo Park, CA (US); Qun Gu, San Jose, CA (US)

(73) Assignee: Black Sesame Technologies Inc., San Jose, CA (US)

( * ) Notice: Subject to any disclaimer, the term of this patent is extended or adjusted under 35 U.S.C. 154(b) by 896 days.

(21) Appl. No.: 16/380,813

(22) Filed: Apr. 10, 2019

(65) Prior Publication Data

US 2020/0234112 A1 Jul. 23, 2020

Related U.S. Application Data

(60) Provisional application No. 62/795,407, filed on Jan. 22, 2019.

(51) Int. Cl.
*G06N 3/08* (2006.01)
*G06F 7/544* (2006.01)

(52) U.S. Cl.
CPC .............. *G06N 3/08* (2013.01); *G06F 7/5443* (2013.01)

(58) Field of Classification Search
CPC ........ G06N 3/08; G06N 3/0454; G06N 3/063; G06N 3/082; G06F 7/5443; G06F 2207/382; G06F 2207/4824
See application file for complete search history.

(56) References Cited

U.S. PATENT DOCUMENTS

| | | | | |
|---|---|---|---|---|
| 2016/0328645 A1* | 11/2016 | Lin | .......................... | G06N 3/08 |
| 2016/0328647 A1* | 11/2016 | Lin | .......................... | G06F 17/11 |
| 2018/0046894 A1* | 2/2018 | Yao | .......................... | G06F 7/483 |
| 2018/0046903 A1* | 2/2018 | Yao | .......................... | G06N 3/082 |
| 2018/0314940 A1* | 11/2018 | Kundu | ................. | G06N 3/0454 |
| 2019/0012559 A1* | 1/2019 | Desappan | ............ | G06V 10/764 |
| 2019/0042935 A1* | 2/2019 | Deisher | ................. | G06N 3/063 |
| 2019/0042945 A1* | 2/2019 | Majumdar | ............... | G06N 3/04 |
| 2019/0188557 A1* | 6/2019 | Lowell | .................... | G06N 3/063 |
| 2019/0340492 A1* | 11/2019 | Burger | ..................... | G06N 3/08 |

(Continued)

*Primary Examiner* — Aaron W Carter
(74) *Attorney, Agent, or Firm* — Timothy T. Wang; Ni, Wang & Massand, PLLC

(57) ABSTRACT

A method of adaptive quantization for a convolutional neural network, includes at least one of receiving an acceptable model accuracy, determining a float value multiply accumulate for the layer based on a float value weight and a float value input, quantizing the float value weight at multiple weight quantization precisions, quantizing the float value input at multiple input quantization precisions, determining a multiply accumulate at multiple multiply accumulate quantization precisions based on the weight quantization precisions and the input quantization precisions, determining multiple quantization errors based on differences between the float value multiply accumulate and the multiple multiply accumulate quantization precisions and selecting one of the multiple weight quantization precisions, one of the multiple input quantization precisions and one of the multiple multiply accumulate quantization precisions based on the predetermined acceptable model accuracy and the multiple quantization errors.

13 Claims, 7 Drawing Sheets

(56) References Cited

U.S. PATENT DOCUMENTS

| | | | |
|---|---|---|---|
| 2019/0354842 A1* | 11/2019 | Louizos | G06N 3/0454 |
| 2020/0193270 A1* | 6/2020 | Wu | G06N 3/082 |
| 2020/0193273 A1* | 6/2020 | Chung | G06F 9/54 |
| 2020/0210838 A1* | 7/2020 | Lo | G06F 9/30025 |
| 2020/0218982 A1* | 7/2020 | Annau | G06N 20/00 |
| 2020/0234112 A1* | 7/2020 | Wang | G06N 3/08 |
| 2020/0279153 A1* | 9/2020 | Fowers | G06N 3/08 |
| 2020/0372328 A1* | 11/2020 | Larzul | G06N 3/082 |
| 2020/0394522 A1* | 12/2020 | Liu | G06N 3/063 |
| 2020/0394523 A1* | 12/2020 | Liu | G06N 20/00 |
| 2021/0019630 A1* | 1/2021 | Yao | G06N 3/063 |
| 2021/0064985 A1* | 3/2021 | Sun | G06N 3/063 |
| 2021/0089925 A1* | 3/2021 | Partovi Nia | G06F 17/16 |
| 2021/0097393 A1* | 4/2021 | Wang | G06N 3/0454 |
| 2021/0279574 A1* | 9/2021 | Liu | G06N 3/0454 |
| 2021/0279635 A1* | 9/2021 | Gadelrab | G06F 11/3466 |
| 2021/0286688 A1* | 9/2021 | Liu | G06N 3/0481 |
| 2021/0377122 A1* | 12/2021 | Pennello | H04L 41/0896 |
| 2022/0114413 A1* | 4/2022 | Qi | G06N 3/04 |
| 2022/0284260 A1* | 9/2022 | Patel | G06N 3/10 |

* cited by examiner

300

ADAPTIVE QUANTIZATION AND MIXED PRECISION IN A NETWORK

BACKGROUND

Technical Field

The instant disclosure is related to convolutional neural networks and specifically improving the efficiency of operation within the network.

Background

Convolutional neural networks are generally composed of a plurality of convolutional layers and at least one fully connected layer. A convolutional layer has input activations, filters and output activations. Within a convolutional layer filters are convolved and run across the input activations. The filter is multiplied element by element by the input activations and the results are summed. The filter is then shifted by a stride across the input activations to produce the next set of output activations. This process is complex and memory bandwidth intensive.

A method is sought to reduce the computational complexity and memory bandwidths without a significant reduction in accuracy.

SUMMARY

An example method of adaptive quantization for a convolutional neural network, includes at least one of receiving a predetermined acceptable model accuracy for a layer in the network, determining a float value multiply accumulate for the layer based on a float value weight and a float value input, quantizing the float value weight at a plurality of weight quantization precisions, quantizing the float value input at a plurality of input quantization precisions, determining a multiply accumulate at a plurality of multiply accumulate quantization precisions based on the plurality of weight quantization precisions and the plurality of input quantization precisions, determining a plurality of quantization errors based on differences between the float value multiply accumulate and the plurality of multiply accumulate quantization precisions and selecting the one of the plurality of weight quantization precisions, one of the plurality of input quantization precisions and one of the plurality of multiply accumulate quantization precisions based on the predetermined acceptable model accuracy for the layer and the plurality of quantization errors.

DETAILED DESCRIPTION OF THE INVENTION

The embodiments listed below are written only to illustrate the applications of this apparatus and method, not to limit the scope. The equivalent form of modifications towards this apparatus and method shall be categorized as within the scope the claims.

Certain terms are used throughout the following description and claims to refer to particular system components. As one skilled in the art will appreciate, different companies may refer to a component and/or method by different names. This document does not intend to distinguish between components and/or methods that differ in name but not in function.

In the following discussion and in the claims, the terms "including" and "comprising" are used in an open-ended fashion, and thus may be interpreted to mean "including, but not limited to . . . ." Also, the term "couple" or "couples" is intended to mean either an indirect or direct connection. Thus, if a first device couples to a second device that connection may be through a direct connection or through an indirect connection via other devices and connections.

Figure 1:
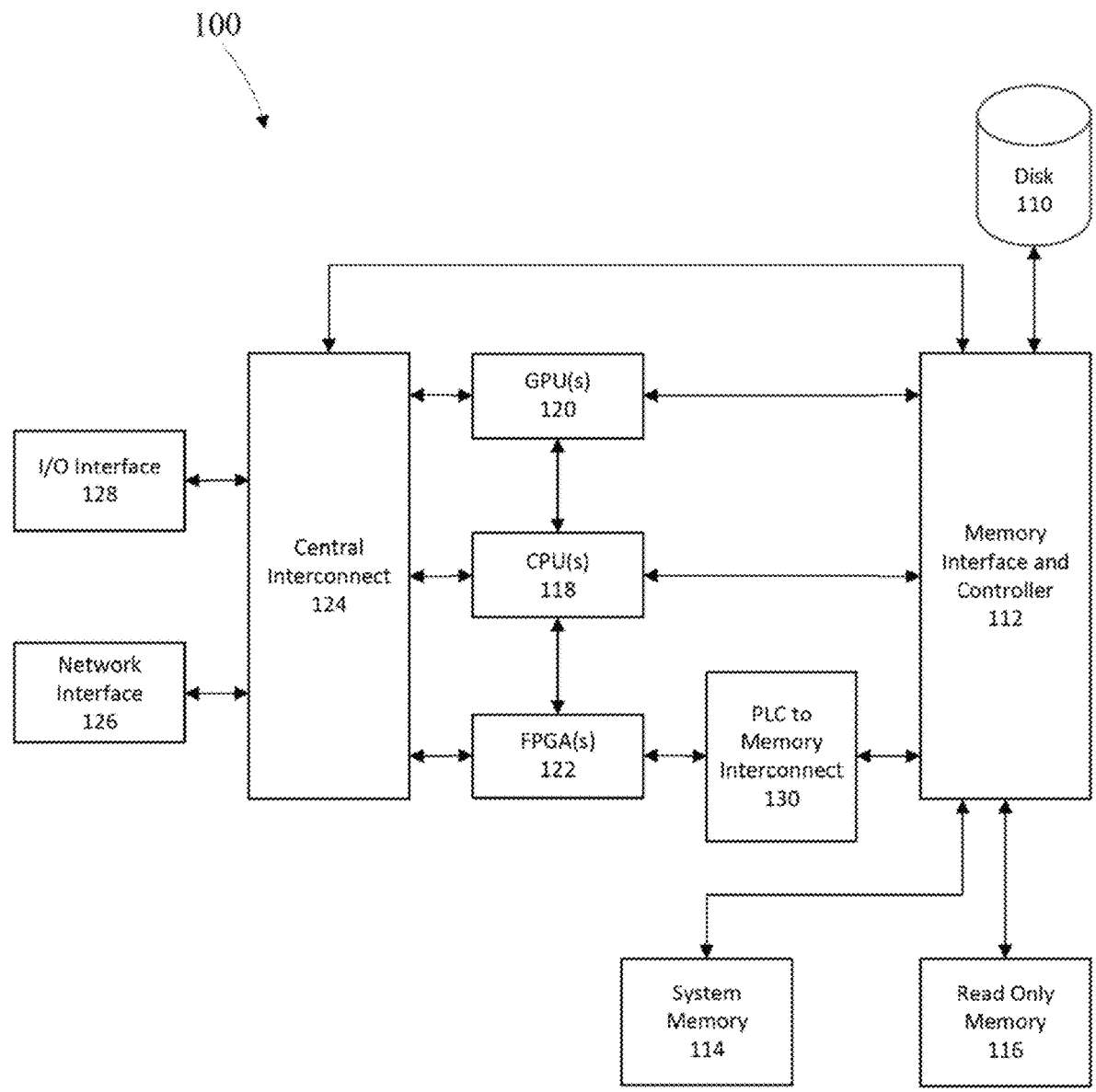
FIG. 1 is a first example system diagram in accordance with one embodiment of the disclosure.

FIG. 1 depicts an example hybrid computational system 100 that may be used to implement neural nets associated with the operation of one or more portions or steps of processes 500, 600 and 700. In this example, the processors associated with the hybrid system comprise a field programmable gate array (FPGA) 122, a graphical processor unit (GPU) 120 and a central processing unit (CPU) 118.

The processing units 118, 120 and 122 have the capability of providing a neural net. A CPU is a general processor that may perform many different functions, its generality leads to the ability to perform multiple different tasks, however, its processing of multiple streams of data is limited and its function with respect to neural networks is very limited. A GPU is a graphical processor which has many small processing cores capable of processing parallel tasks in sequence. An FPGA is a field programmable device, it has the ability to be reconfigured and perform in hardwired circuit fashion any function that may be programmed into a CPU or GPU. Since the programming of an FPGA is in circuit form, its speed is many times faster than a CPU and appreciably faster than a GPU.

There are other types of processors that the system may encompass such as an accelerated processing unit (APUs) which comprise a CPU with GPU elements on chip and digital signal processors (DSPs) which are specialized for performing high speed numerical data processing. Application specific integrated circuits (ASICs) may also perform the hardwired functions of an FPGA; however, the lead time to design and produce an ASIC is on the order of quarters of a year, not the quick turn-around implementation that is available in programming an FPGA.

The graphical processor unit 120, central processing unit 118 and field programmable gate arrays 122 are connected to one other and are connected to a memory interface controller 112. The FPGA is connected to the memory interface through a programmable logic circuit to memory interconnect 130. This additional device is utilized due to the fact that the FPGA is operating with a very large bandwidth and to minimize the circuitry utilized from the FPGA to perform memory tasks. The memory and interface controller 112 is additionally connected to persistent memory disk 110, system memory 114 and read only memory (ROM) 116.

Figure 2:
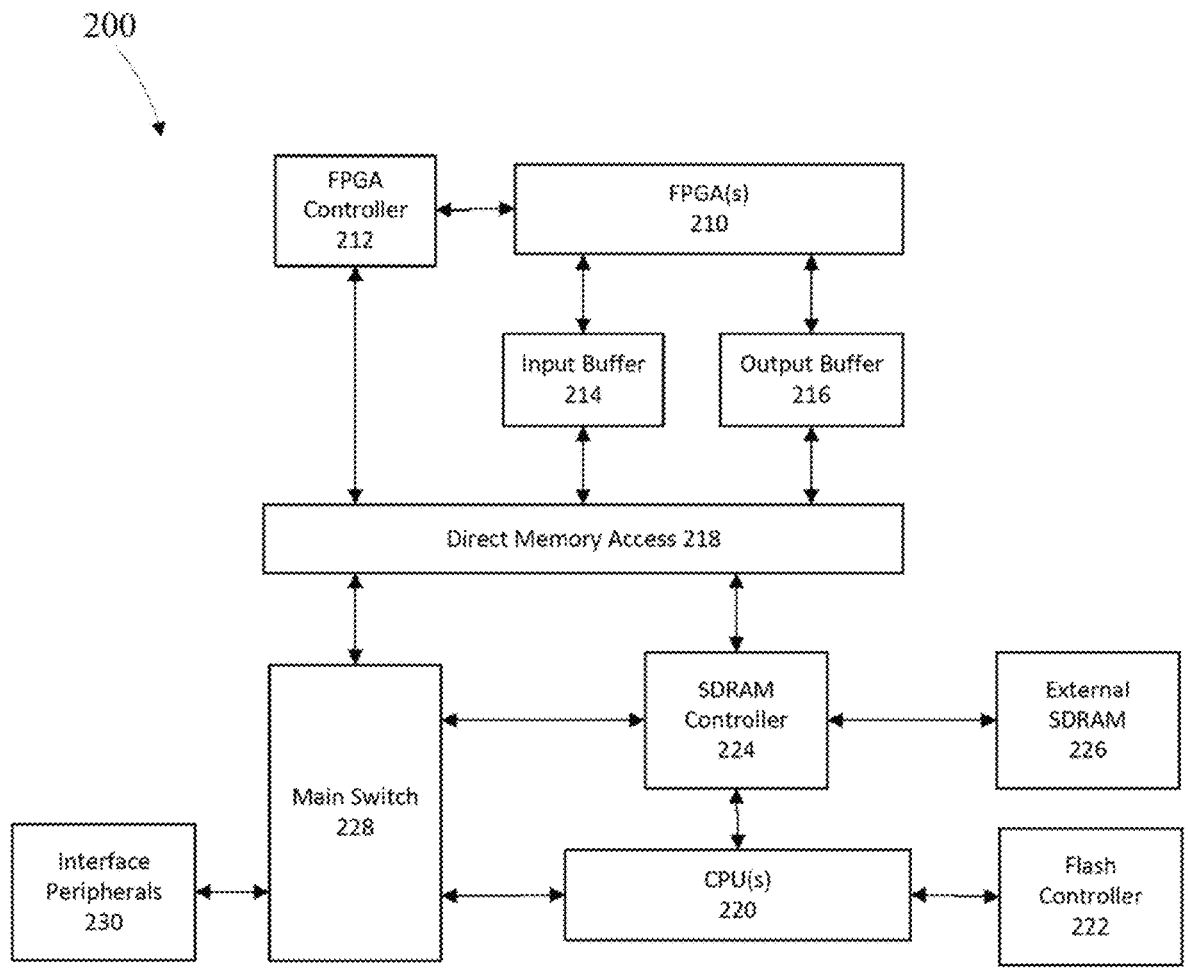
FIG. 2 is a second example system diagram in accordance with one embodiment of the disclosure.

The system of FIG. 2 may be utilized for programming and training the FPGA. The GPU functions well with unstructured data and may be utilized for training, once the data has been trained a deterministic inference model may be found and the CPU may program the FPGA with the model data determined by the GPU.

The memory interface and controller is connected to a central interconnect 124, the central interconnect is additionally connected to the GPU 120, CPU 118 and FPGA 122. The central interconnect 124 is additionally connected to the input and output interface 128 and the network interface 126.

FIG. 2 depicts a second example hybrid computational system 200 that may be used to implement neural nets associated with the operation of one or more portions or steps of process 600. In this example, the processors associated with the hybrid system comprise a field programmable gate array (FPGA) 210 and a central processing unit (CPU) 220.

The FPGA is electrically connected to an FPGA controller 212 which interfaces with a direct memory access (DMA) 218. The DMA is connected to input buffer 214 and output buffer 216, both of which are coupled to the FPGA to buffer data into and out of the FPGA respectively. The DMA 218 has two first in first out (FIFO) buffers one for the host CPU and the other for the FPGA, the DMA allows data to be written to and read from the appropriate buffer.

On the CPU side of the DMA are a main switch 228 which shuttles data and commands to the DMA. The DMA is also connected to a synchronous dynamic random access memory (SDRAM) controller 224 which allows data to be shuttled to and from the FPGA to the CPU 220, the SDRAM controller is also connected to external SDRAM 226 and the CPU 220. The main switch 228 is connected to the peripherals interface 230. A flash controller 222 controls persistent memory and is connected to the CPU 220.

Network computational complexity poses challenges in deploying deep networks in resource-constrained edge environments. Quantization is one method to address this challenge by transferring computation in single precision float value (FP32) to a fixed point value, which significantly reduces model complexity.

Figure 3:
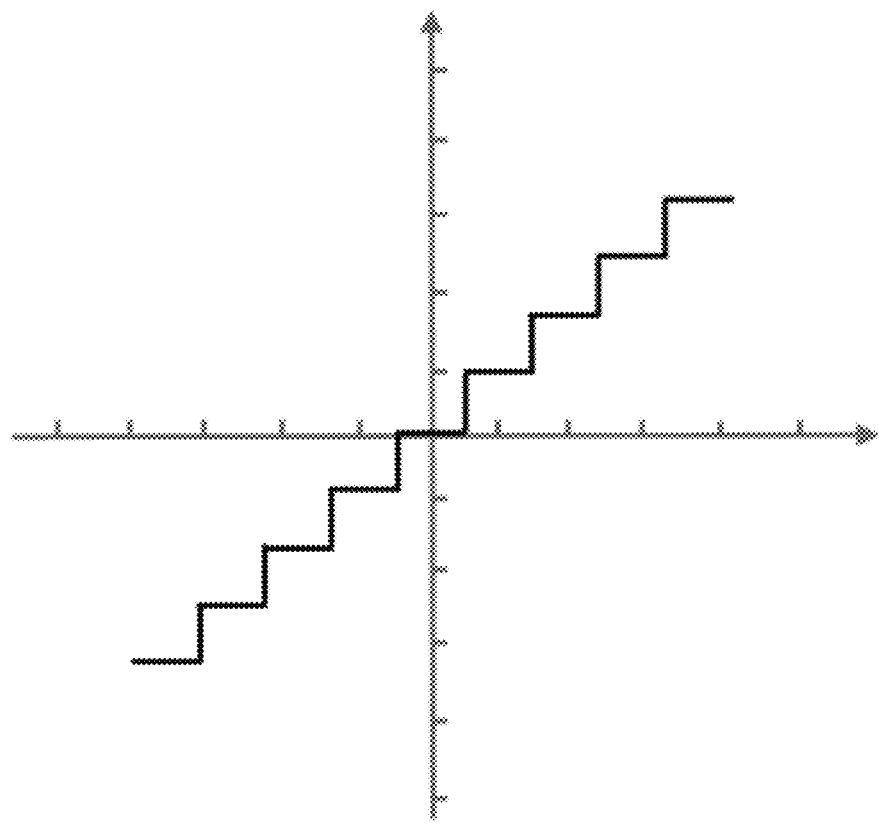
FIG. 3 is an example depiction of numerical quantization in accordance with one embodiment of the disclosure.

FIG. 3, 300 depicts an example of a symmetric quantizer. Assume x is a variable to quantize, and quantization step size is $\Delta_s$, then quantization result $x_Q$ can be obtained through $$x_{round} = \text{round}(x/\Delta_s)$$

$$x_Q = \text{clip}{-N/2+1, N/2-1, x_{round}}\ \text{if signed}$$

$$x_Q = \text{clip}(0, N-1, x_{round})\ \text{if unsigned}$$

where $N=2^{n\_bits}$ and n_bits is the number of representation bits.

Weights and activations are quantized, weights are treated as signed while activations are treated as unsigned. Different layers of the network may be represented by different levels of feature extraction.

Different layers of the network have different sensitivities to numerical precision. Current quantization algorithms ignore this differing sensitivity to numerical precision by assigning a uniform precision of quantization to layers.

One possible solution to reduce computational complexity while retaining accuracy is to utilize adaptive quantization, which assigns varying precisions to different layers. Compared with uniform precision, this possible solution compresses model complexity while maintaining accuracy.

Figure 4:
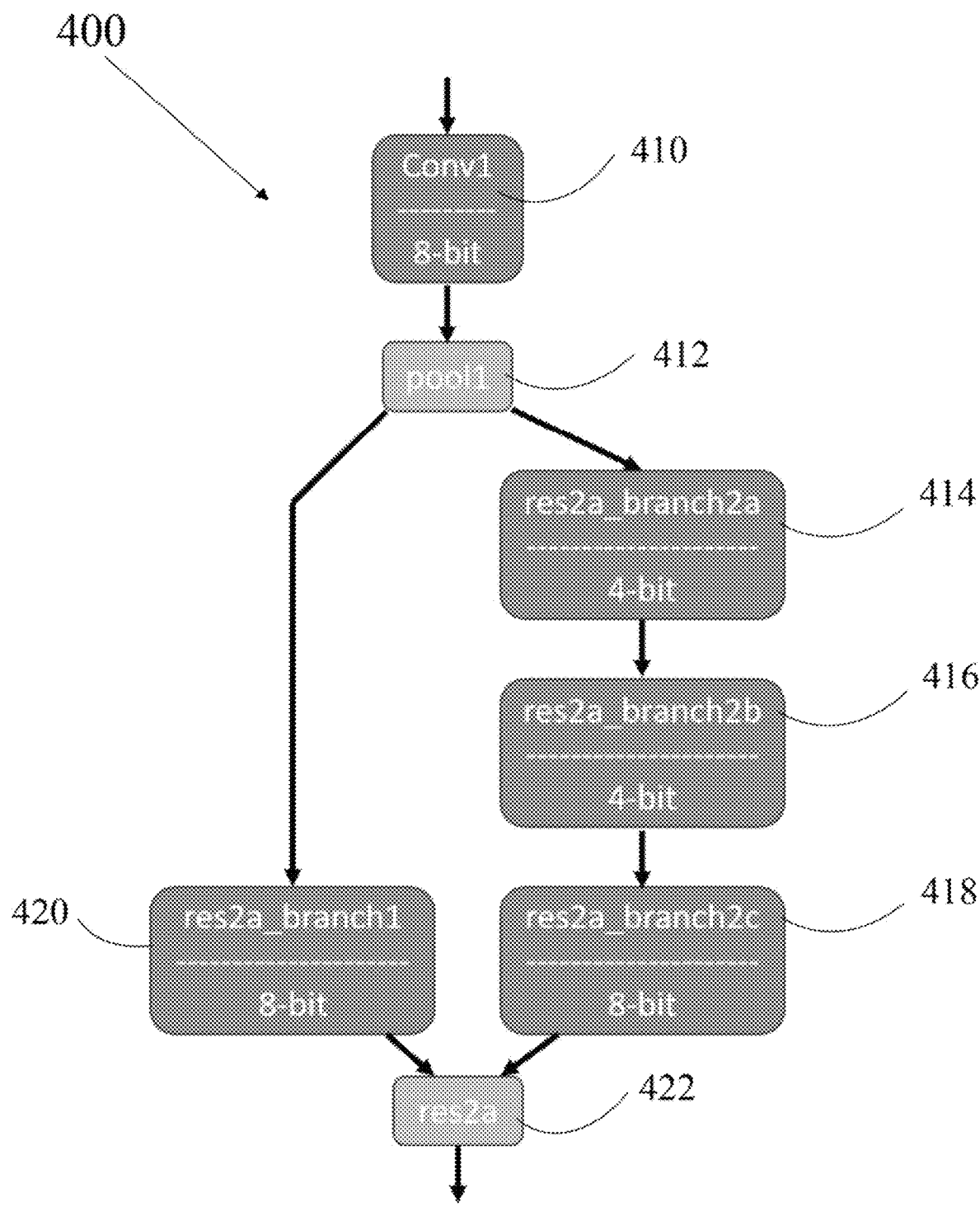
FIG. 4 is a first example of adaptive quantization and mixed precision utilized in a set of network layers in accordance with one embodiment of the disclosure.

An example of mixed precision for a Resnet building block is demonstrated in FIG. 4, in which some of the activations are quantized as 8 bits and others 4 bits. In this example the convolutional layer conv1 410 is quantized to 8 bits, the pooling layer pool1 412 is not quantized, branch layer res2a_branch2a 414 is quantized to 4 bits as is branch layer res2a_branch2b, while branch layers res2a_branch1 420 and res2a_branch2c are quantized to 8 bits before being input to node res2a 422.

The precisions for the different layers are decided by a training process which measures model accuracy. Layers that are more sensitive to quantization are quantized at higher precisions, and layers that are less sensitive to quantization are quantized at lower precisions. In this document precisions and precisions of quantizations refers to the number of bits that a number is quantized to.

Figure 5:
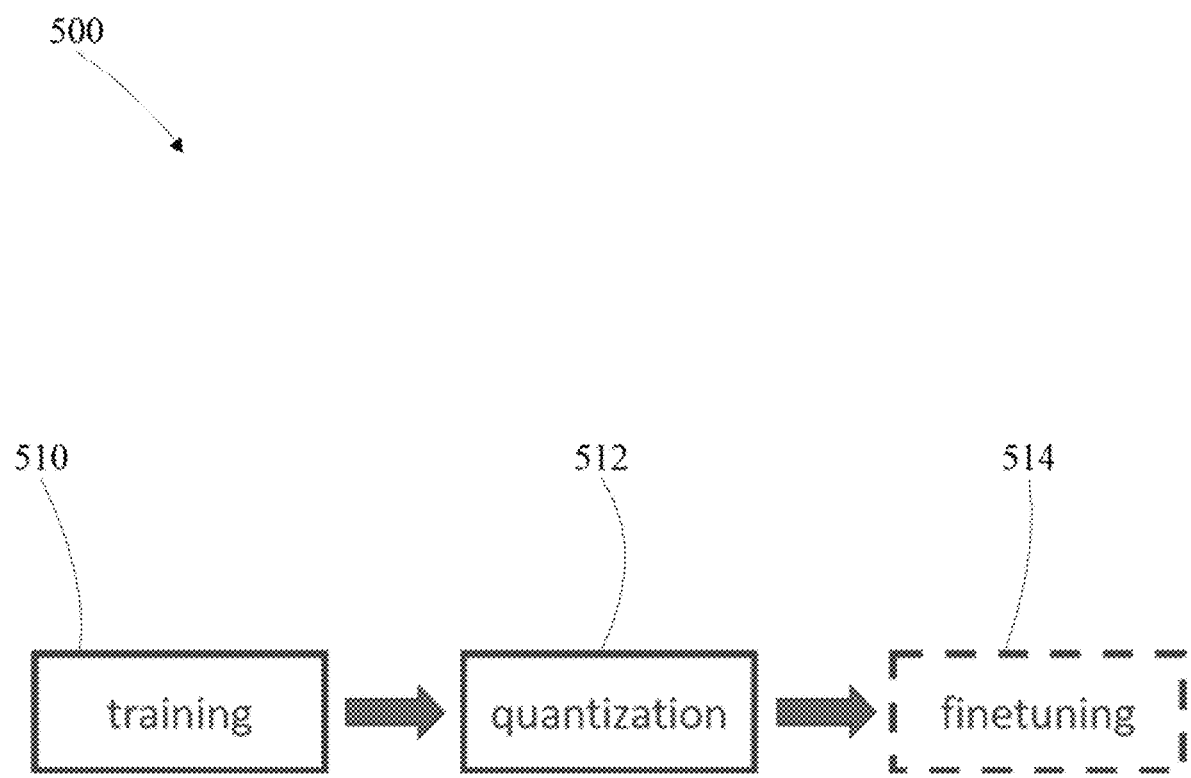
FIG. 5 is a first example of adaptive quantization and mixed precision training flow in accordance with one embodiment of the disclosure.

FIG. 5 depicts a quantization training process which may be composed of two or more stages, depending on whether fine tuning is involved. The training step first trains 510 the network with float values, and then a quantization step 512 discretizes the float values of float weight and float input into integer values. The fine tuning 514 may be utilized to correct errors caused by the quantization process. In the examples there are overall quantization sensitivities, weight quantization sensitivities and input quantization sensitivities.

Figure 6:
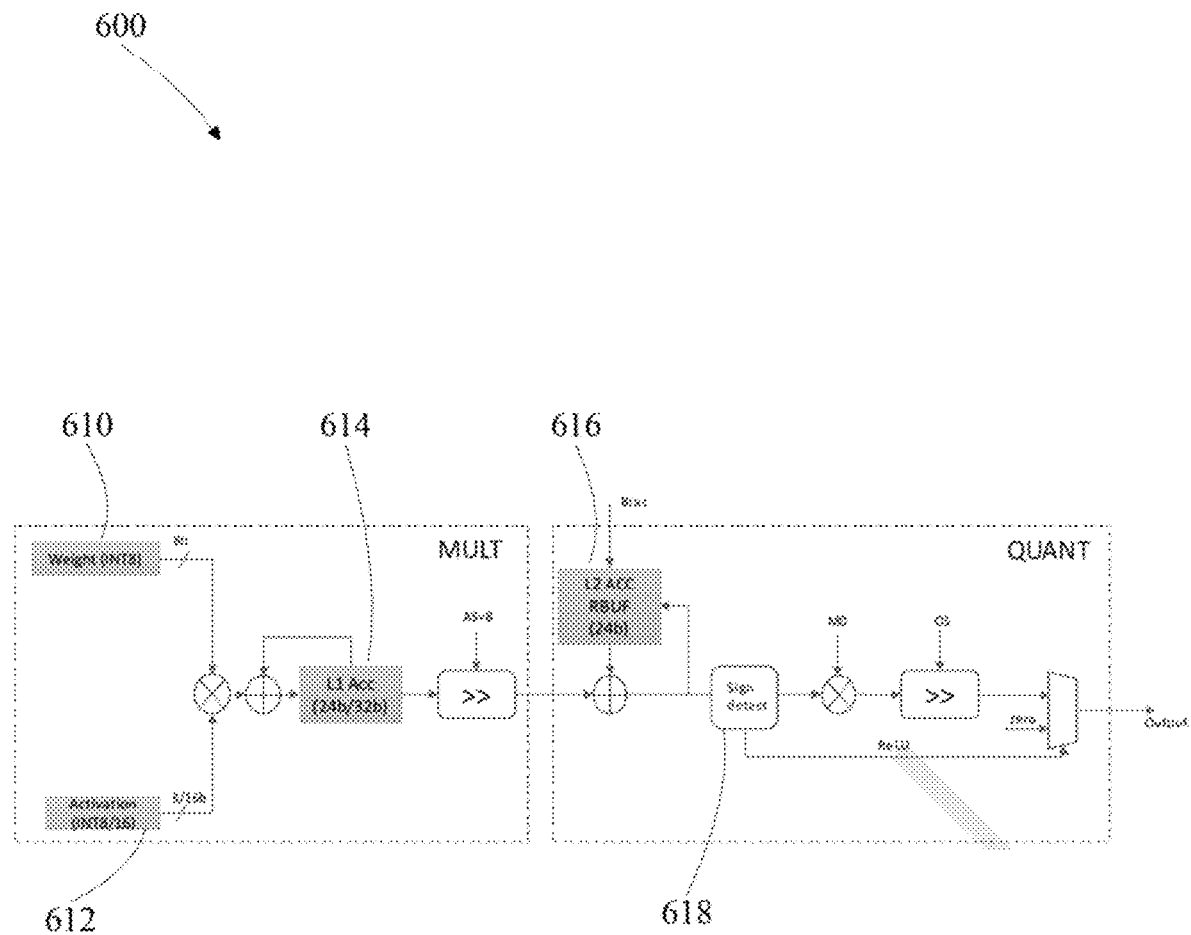
FIG. 6 is a second example of adaptive quantization and mixed precision utilized in a set of operations in accordance with one embodiment of the disclosure.

FIG. 6 depicts an example hardware diagram that supports adaptive quantization, the data representations and calculation units are adjustable to different precisions. In this example, the activations may be integer 8 or 16 bit precision, and the accumulator may be 24 or 32 bit precision. Specifically, in this depiction the differently quantized weights 610 and the differently quantized activations 612 are routed to a multiply accumulator whose output 614 L1 Acc is also quantized. Data from a results buffer L2 Acc may also be quantized before addition to the data from output 614 L1 Acc. Sign detection 618 is performed before routing data to the multiplication or rectified linear unit (ReLU) activation function.

Figure 7:
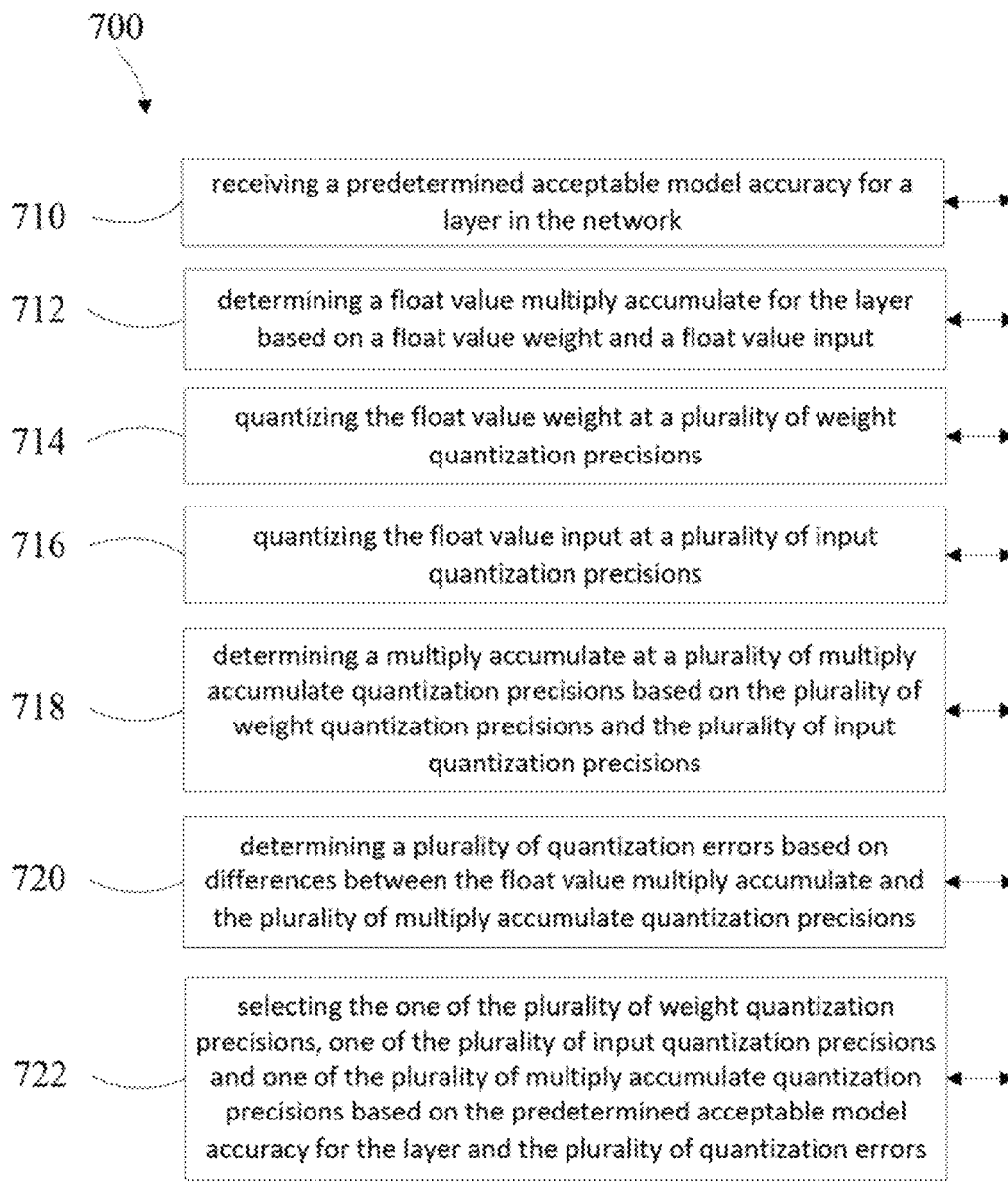
FIG. 7 is an example method of adaptive quantization and mixed precision in accordance with one embodiment of the disclosure.

FIG. 7 depicts an example method of adaptive quantization for a convolutional neural network, including receiving 710 a predetermined acceptable model accuracy for a layer in the network and determining 712 a float value multiply accumulate for the layer based on a float value weight and a float value input. The method also includes quantizing 714 the float value weight at a plurality of weight quantization precisions and quantizing 716 the float value input at a plurality of input quantization precisions. The method includes determining 718 a multiply accumulate at a plurality of multiply accumulate quantization precisions based on the plurality of weight quantization precisions and the plurality of input quantization precisions, determining 720 a plurality of quantization errors based on differences between the float value multiply accumulate and the plurality of multiply accumulate quantization precisions and selecting 722 the one of the plurality of weight quantization precisions, one of the plurality of input quantization precisions and one of the plurality of multiply accumulate quantization precisions based on the predetermined acceptable model accuracy for the layer and the plurality of quantization errors.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

References to "one embodiment," "an embodiment," "some embodiments," "various embodiments", or the like indicate that a particular element or characteristic is included in at least one embodiment of the invention. Although the phrases may appear in various places, the phrases do not necessarily refer to the same embodiment. In conjunction with the present disclosure, those skilled in the art will be able to design and incorporate any one of the variety of mechanisms suitable for accomplishing the above described functionalities.

It is to be understood that the disclosure teaches just one example of the illustrative embodiment and that many variations of the invention can easily be devised by those skilled in the art after reading this disclosure and that the scope of then present invention is to be determined by the following claims.

What is claimed is:

1. A method of adaptive quantization for a convolutional neural network, comprising:
    receiving a predetermined acceptable model accuracy for a layer in the network;
    determining a float value multiply accumulate for the layer based on a float value weight and a float value input;
    quantizing the float value weight at a plurality of weight quantization precisions;
    quantizing the float value input at a plurality of input quantization precisions;
    determining a multiply accumulate at a plurality of multiply accumulate quantization precisions based on the plurality of weight quantization precisions and the plurality of input quantization precisions;
    determining a plurality of quantization errors based on differences between the float value multiply accumulate and the plurality of multiply accumulate quantization precisions; and
    selecting the one of the plurality of weight quantization precisions, one of the plurality of input quantization precisions and one of the plurality of multiply accumulate quantization precisions based on the predetermined acceptable model accuracy for the layer and the plurality of quantization errors.

2. The method of adaptive quantization of claim 1, further comprising determining a weight quantization sensitivity based on the plurality of weight quantization precisions and the float value weight.

3. The method of adaptive quantization of claim 2, further comprising determining an input quantization sensitivity based on the plurality of input quantization precisions and the float value input.

4. The method of adaptive quantization of claim 3, further comprising determining a multiply accumulate quantization sensitivity based on the plurality of multiply accumulate quantization precisions and the float value multiply accumulate.

5. The method of adaptive quantization of claim 4, further comprising determining an overall quantization sensitivity based on the weight quantization sensitivity, the input quantization sensitivity and the multiply accumulate quantization sensitivity.

6. The method of adaptive quantization of claim 5, further comprising minimizing the quantization sensitivity based on the predetermined acceptable model accuracy.

7. The method of adaptive quantization of claim 1, further comprising iterating the layer in the network.

8. The method of adaptive quantization of claim 1, further comprising:
inputting the float value weight for the layer; and
inputting the float value input for the layer.

9. The method of adaptive quantization of claim 8, wherein the float weight is signed.

10. The method of adaptive quantization of claim 8, wherein float input is unsigned.

11. The method of adaptive quantization of claim 1, further comprising selecting the number of quantization bits for the layer.

12. The method of adaptive quantization of claim 11, wherein the number of quantization bits for the layer is determined based on its influence to an overall accuracy for the network.

13. The method of adaptive quantization of claim 11, wherein a lower number of quantization bits for the layer is selected if the layer is less sensitive to quantization.

* * * * *